US011643141B2

(12) United States Patent
Alloin et al.

(10) Patent No.: US 11,643,141 B2
(45) Date of Patent: May 9, 2023

(54) TRAILER ASSEMBLY AND ASSOCIATED SELF-ERECTING CRANE

(71) Applicant: MANITOWOC CRANE GROUP FRANCE, Dardilly (FR)

(72) Inventors: Yves Alloin, St Germain en Brionnais (FR); Olivier Gay, Baudemont (FR); Simon Grimaud, Lyons (FR); Vincent Veillerot, Tassin la Demi Lune (FR); Téva Maly, Lyons (FR)

(73) Assignee: MANITOWOC CRANE GROUP FRANCE, Dardilly (FR)

( * ) Notice: Subject to any disclaimer, the term of this patent is extended or adjusted under 35 U.S.C. 154(b) by 226 days.

(21) Appl. No.: 17/216,965

(22) Filed: Mar. 30, 2021

(65) Prior Publication Data

US 2021/0300468 A1   Sep. 30, 2021

(30) Foreign Application Priority Data

Mar. 30, 2020 (FR) .................................. 2003112

(51) Int. Cl.
*B62D 13/00* (2006.01)
*B62D 1/28* (2006.01)
(Continued)

(52) U.S. Cl.
CPC .............. *B62D 13/00* (2013.01); *B60S 9/12* (2013.01); *B62D 1/283* (2013.01); *B62D 5/0403* (2013.01);
(Continued)

(58) Field of Classification Search
CPC .. B60S 9/12; B62D 1/283; B62D 5/20; B62D 5/0403; B62D 7/1509; B62D 13/00;
(Continued)

(56) References Cited

U.S. PATENT DOCUMENTS

2004/0221673 A1* 11/2004 Mojzis .................. B66C 23/344
74/469
2016/0185359 A1    6/2016 Mayer et al.
2019/0055741 A1    2/2019 Henikl et al.

FOREIGN PATENT DOCUMENTS

DE          4334279 A1    4/1995
DE         19856593 A1    6/1999
(Continued)

OTHER PUBLICATIONS

Search Report and English translation of Written Opinion issued by the French Patent Office in connection with corresponding French patent application FR20/03112, dated Dec. 15, 2020.

*Primary Examiner* — Kevin Hurley
*Assistant Examiner* — Felicia L. Brittman
(74) *Attorney, Agent, or Firm* — Cook Alex Ltd.

(57) ABSTRACT

A trailer assembly includes first and second axles supporting first and second wheels which are coupled to first and second actuators of a steering system. The steering system includes a control circuit connected to the actuators and the control circuit includes a driving device configurable in a low speed maneuvering mode with: a synchronized sub-mode in which the actuators can be actuated in a synchronized manner to steer the wheels in a synchronized manner, and a desynchronized sub-mode in which the first and second actuators can be actuated individually and independently to steer only the first wheels or only the second wheels. A control device is connected to the driving device to: select one of the sub-modes in the low speed maneuvering mode, and select an actuation either of the first actuator or of the second actuator, in the desynchronized sub-mode.

21 Claims, 5 Drawing Sheets

(51) Int. Cl.
*B62D 5/20* (2006.01)
*B60S 9/12* (2006.01)
*B62D 5/04* (2006.01)
*F15B 11/16* (2006.01)
*F15B 15/20* (2006.01)

(52) U.S. Cl.
CPC ............... B62D 5/20 (2013.01); F15B 11/16 (2013.01); F15B 15/20 (2013.01)

(58) Field of Classification Search
CPC ....... B62D 13/04; B66C 23/344; F15B 11/16; F15B 15/20
USPC ........................................................ 180/418
See application file for complete search history.

(56) References Cited

FOREIGN PATENT DOCUMENTS

| EP | 0439370 | A1 | 7/1991 |
| EP | 1235734 | B1 | 10/2003 |
| EP | 2508680 | A1 | 10/2012 |
| EP | 2974942 | A1 | 1/2016 |

* cited by examiner

FIG. 9

TRAILER ASSEMBLY AND ASSOCIATED SELF-ERECTING CRANE

TECHNICAL FIELD

The invention relates to a trailer assembly.

The invention finds a favorite and non-limiting application for a self-erecting crane equipped with such a trailer assembly.

The invention relates more particularly to a trailer assembly comprising a chassis resting, by means of a suspension device, on a double-axle device comprising a first axle supporting first wheels and a second axle supporting second wheels; such a trailer assembly being able to be applied to a towing on a drawbar, and also to a towing on a fifth wheel also called semi-towing.

TECHNOLOGICAL BACKGROUND

The use of a double-axle device is advantageous to accept a high load on the chassis, as is the case for a self-erecting crane, in particular to increase the lifting capacity of the crane with ballasts carried by the chassis.

However, the double-axle device has reduced maneuver capability compared to a single-axle device, and promotes the skidding phenomena, which can damage the double-axle device or the terrain on which the trailer assembly operates.

Indeed, during low speed maneuvers (below a low speed threshold in the range of 5 to 10 km/h), necessary to correctly position the crane assembly in a final position, it is practical to be able to steer the wheels of the trailer assembly, and not just the wheels of the tractor truck that tows the trailer assembly, whether it is towing on a drawbar or towing on a fifth wheel.

The document EP1235734 thus proposes a trailer assembly which uses a first hydraulic steering system for a synchronized steering of the first wheels and the second wheels during low speed maneuvers. To do this, this first hydraulic steering system comprises a hydraulic cylinder which acts on the first axle, and the second axle is mechanically coupled to the first axle by a longitudinal return connecting rod, such that with a single hydraulic cylinder it is possible to pivot the two axles at the same time, and therefore to steer the first wheels and the second wheels in synchronization. The document DE19856593A1, or its equivalent EP1037848, also describes this type of trailer assembly, for a self-erecting crane, which implements a single hydraulic cylinder associated to a longitudinal return connecting rod to synchronize the pivoting of the two axles.

However, this first hydraulic steering system has the drawback of being bulky, mainly because of the use of a longitudinal return connecting rod which should be large-sized (because in the length) to transmit a steering torque between both axles. Moreover, the synchronized steering of the two axles reduces the maneuver capability in a reduced space.

It is moreover known to use a second hydraulic steering system for a synchronized steering of the first wheels and the second wheels during low speed maneuvers. To do this, this second hydraulic steering system comprises a first hydraulic cylinder which acts on the first axle, and a second hydraulic cylinder which acts on the second axle, where the first hydraulic cylinder and the second hydraulic cylinder are connected to the same hydraulic power plant which power them in a synchronized manner, such that it pivots both axles at the same time, and therefore steers the first wheels and the second wheels in synchronization.

However, this second hydraulic steering system has limits, in particular in the event of skidding (difference in adhesion between some wheels) or in the case of external forces applied asymmetrically on the wheels (for example the first wheels on the left are in abutment on an obstacle such as a sidewalk) which cause a desynchronization of the directions of the wheels with adverse consequences for the second hydraulic steering system, and a loss of control in the maneuver.

The state of the art can also be illustrated by the teachings of the document US2004/0221673, which proposes a trailer assembly, for a self-erecting crane, comprising a first axle and a second axle which can be steered synchronously or independently, and a control device for monitoring the directions of the first axle and the second axle. Although advantageous for the low-speed maneuvers by allowing independently steering the axles, this trailer assembly has the drawback of using a steering system, for example hydraulic steering systems, necessarily complex because allowing steering at the same time and independently the first axle and the second axle. This driving of the steering of the two axles, at the same time and independently or individually, therefore also complicates the control device which should use a first steering member to steer the first axle, and a second steering member to steer the second axle, and also to a selection member to select a synchronized or independent steering.

SUMMARY

The invention proposes to solve all or part of these problems, by proposing a trailer assembly provided with a steering system suitable for dynamically correcting orientation defects of the wheels which should be due to skidding phenomena or to external forces which are applied asymmetrically to the wheels, while offering a reduced space requirement.

Another object of the invention is to propose a steering system associated to a control device which are simple in terms of design and use, while allowing responding to the problem identified above of the skidding phenomena and external forces which are applied asymmetrically on the wheels.

To this end, the invention proposes a trailer assembly, comprising a chassis, a suspension device, a double-axle device, first wheels and second wheels, where said chassis rests, via said suspension device, on said double-axle device, wherein the double-axle device comprises a first axle supporting the first wheels and a second axle supporting the second wheels, and wherein the trailer assembly comprises a steering system to steer the first wheels and the second wheels during maneuvers below a low speed threshold, said steering system comprises a first actuator which is coupled to the first wheels, a second actuator which is coupled to the second wheels, and a control circuit connected to the first actuator and to the second actuator, wherein said control circuit comprises a driving device configurable in a low speed maneuvering mode in which at least one of the first actuator and the second actuator can be actuated to steer at least one of the first wheels and the second wheels, and in which, in the low speed maneuvering mode, said trailer assembly being remarkable in that the driving device is sub-configurable between:

a synchronized sub-mode in which the first actuator and the second actuator can be actuated in a synchronized manner to steer the first wheels and the second wheels in a synchronized manner; and a desynchronized sub-mode in which the first actuator and the second actuator can be actuated individually and independently to steer either only the first wheels or only the second wheels;

said trailer assembly further comprising a control device which is connected to the driving device to:

select either the synchronized sub-mode or the desynchronized sub-mode when the driving device is in the low speed maneuvering mode; and select an actuation either of the first actuator or of the second actuator in the desynchronized sub-mode;

and in that the control device includes:

a selection member to select among the three sub-modes comprising the synchronized sub-mode, the desynchronized sub-mode with actuation of the first actuator alone, and the desynchronized sub-mode with actuation of the second actuator alone; and a steering member to steer the first wheels and the second wheels.

Thus, the invention proposes a driving device which allows:

with a selection on the selection member of the control device, to operate either in the synchronized sub-mode, or in the desynchronized sub-mode with actuation of the first actuator alone, or in the desynchronized sub-mode with actuation of the second actuator alone and, moreover, by acting on the steering member of the control device, either to steer the first wheels and the second wheels in a synchronized manner if it is the synchronized sub-mode which is selected, or to steer the first wheels alone if it is the desynchronized sub-mode with actuation of the first actuator alone which is selected (the second wheels then remaining fixed), or to steer the second wheels alone if it is the desynchronized sub-mode with actuation of the only second actuator which is selected (the first wheels then remaining fixed).

Also, once in desynchronized sub-mode, the steering member allows steering either the first wheels or the second wheels. In this manner, an operator can choose to either steer the first wheels and the second wheels synchronously, or to steer the first wheels alone, or to steer the second wheels alone. In other words, the control device allows both choosing the mode or sub-mode adapted to the situation, and also steering the wheels (either synchronously in the synchronized sub-mode, or individually and independently in the desynchronized sub-mode).

Thanks to the invention, it is therefore possible to dynamically adapt the direction of the first wheels and of the second wheels, depending on the desired trajectory in a low-speed maneuver, and depending on a possible case of skidding or external forces applied asymmetrically on the wheels, by means of a driving device and a user-friendly control device.

In a particular embodiment, the driving device is configurable between:

a transport mode in which the first actuator and the second actuator cannot be actuated to lock the first wheels and the second wheels in a straight position associated to a straight-line displacement; and the low speed maneuvering mode;

and the control device is connected to the driving device to select either the transport mode, or the low speed maneuvering mode.

In this manner, during a road transport, therefore at high speed, the transport mode is selected and the wheels remain straight. On the contrary, during low speed maneuvers, and if necessary, the low speed maneuvering mode can be selected, with the choice between the desynchronized sub-mode and the desynchronized sub-mode.

According to one possibility, the selection member comprises return means which biases a return of the selection member into the neutral position associated to the synchronized sub-mode.

This return means on the selection member is particularly advantageous because it allows the synchronized sub-mode to be the default sub-mode, without intervention of the operator on the selection member or in the case of release of the selection member by the operator, this synchronized sub-mode being the sub-mode which will be the most used during low-speed maneuvers, the two desynchronized sub-modes being exceptional sub-modes used in particular in the case of a skidding phenomenon or an external force which is applied asymmetrically on the wheels. Said return means of the selection member could be a spring device, such as a spring, an elastic member, a pusher system or equivalent.

According to another possibility, the steering member comprises return means which biases a return of the steering member into a neutral position associated to an alignment of the first wheels and the second wheels in a straight position associated to a straight-line displacement.

This return means on the steering member is particularly advantageous because it allows the straight-line displacement to be the default movement, without intervention of the operator on the steering member or in the case of release of the steering member by the operator. Said return means of the steering member could be a spring device, such as a spring, an elastic member, a pusher system or equivalent.

According to one feature, the first actuator is a first cylinder and the second actuator is a second cylinder.

In a first embodiment, the first cylinder is a first electric cylinder, the second cylinder is a second electric cylinder, and the control circuit is an electric circuit.

In a second embodiment, the first cylinder is a first hydraulic cylinder, the second cylinder is a second hydraulic cylinder, and the control circuit is a hydraulic control circuit hydraulically powered by at least one hydraulic power plant, and this hydraulic control circuit comprises a first hydraulic sub-circuit connected to the first hydraulic cylinder and a second hydraulic sub-circuit connected to the second hydraulic cylinder, the first hydraulic sub-circuit and the second hydraulic sub-circuit being in parallel.

This conformation in parallel of the first hydraulic sub-circuit and of the second hydraulic sub-circuit is advantageous, because it allows improving the reliability of the desynchronized sub-mode with actuation of the first actuator alone (which takes place through the first hydraulic sub-circuit) and the desynchronized sub-mode with actuation of the second actuator alone (which takes place through the second hydraulic sub-circuit), while allowing an operation in the synchronized sub-mode (which takes place through a parallel operation of the first hydraulic sub-circuit and the second hydraulic sub-circuit).

According to one possibility, the first hydraulic sub-circuit and the second hydraulic sub-circuit are hydraulically powered:

either by a common hydraulic power plant, and a flow divider is disposed between the common hydraulic power plant and the first hydraulic sub-circuit and the second hydraulic sub-circuit (to equitably distribute the hydraulic pressure in the two sub-circuits);

or by two respective hydraulic power plant operating in parallel.

According to another possibility, the driving device comprises:
- a first hydraulic distributor placed on the first hydraulic sub-circuit and equipped with at least one first solenoid valve to actuate the first hydraulic cylinder, said at least one first solenoid valve being in connection with the control device; and
- a second hydraulic distributor placed on the second hydraulic sub-circuit and equipped with at least one second solenoid valve to actuate the second hydraulic cylinder, said at least one second solenoid valve being in connection with the control device.

Thus, the selection with the control device is made by acting on the first solenoid valve(s) and on the second solenoid valve(s).

In a particular embodiment, the first hydraulic cylinder is a first double-acting hydraulic cylinder joined to two first ways of the first hydraulic sub-circuit, and the second hydraulic cylinder is a second double-acting hydraulic cylinder joined to two second ways of the second hydraulic sub-circuit.

According to one feature, the first hydraulic distributor is a first hydraulic spool valve which comprises at least one first open spool associated to an actuation of the first double-acting hydraulic cylinder in a first direction, and one second open spool associated to an actuation of the first double-acting hydraulic cylinder in a second direction opposite to the first direction, and in which the at least one first solenoid valve controls the selection between the first open spool and the second open spool.

Similarly, the second hydraulic distributor is a second hydraulic spool valve which comprises at least one first open spool associated to an actuation of the second double-acting hydraulic cylinder in a first direction, and one second open spool associated to an actuation of the second double-acting hydraulic cylinder in a second direction opposite to the first direction, and in which the at least one second solenoid valve controls the selection between the first open spool and the second open spool.

Thus, when the synchronized sub-mode is selected, the first hydraulic spool valve and the second hydraulic spool valve are both in the same configuration:
- either each with the first open spool which is active to synchronously displace the two double-acting hydraulic cylinders in the first direction;
- either each with the second open spool which is active to synchronously displace the two double-acting hydraulic cylinders in the second direction.

When the desynchronized sub-mode is selected and it is the first double-acting hydraulic cylinder which is actuated, then:
- the first hydraulic spool valve has either the first open spool thereof which is active or the second open spool thereof which is active; and
- the second hydraulic spool valve is for example no longer powered or it is closed.

Similarly, the desynchronized sub-mode is selected and it is the second double-acting hydraulic cylinder which is actuated, then:
- the second hydraulic spool valve has either the first open spool thereof which is active or the second open spool thereof which is active; and
- the first hydraulic spool valve is for example no longer powered or it is closed.

Advantageously, the first hydraulic spool valve comprises a third closed spool associated to a non-actuation of the first double-acting hydraulic cylinder, and the at least one first solenoid valve comprises at least two first solenoid valves which control the selection between the first open spool, the second open spool and the third closed spool.

Similarly, the second hydraulic spool valve comprises a third closed spool associated to a non-actuation of the second double-acting hydraulic cylinder, and the at least one second solenoid valve comprises at least two second solenoid valves which control the selection between the first open spool, the second open spool and the third closed spool.

In other words, the third closed spool corresponds to a closure of the corresponding hydraulic spool valve.

Thus, when the desynchronized sub-mode is selected and it is the first double-acting hydraulic cylinder which is actuated, then:
- the first hydraulic spool valve has either the first spool thereof which is active or the second spool thereof which is active; and
- the second hydraulic spool valve, for its part, has the third spool thereof which is active, and therefore the second hydraulic spool valve is closed.

Similarly, when the desynchronized sub-mode is selected and it is the second double-acting hydraulic cylinder which is actuated, then:
- the second hydraulic spool valve has either the first open spool thereof which is active or the second open spool thereof which is active; and
- the first hydraulic spool valve, for its part, has the third spool thereof which is active, and therefore the first hydraulic spool valve is closed.

Moreover, when the transport mode is selected, each of the hydraulic spool valves has the third spool thereof which is active, such that they are both closed.

In an advantageous embodiment, the two first solenoid valves are each equipped with a return system biasing towards a selection of the third closed spool of the first hydraulic spool valve, and the two second solenoid valves are each equipped with a return system biasing towards a selection of the third closed spool of the second hydraulic spool valve.

Thus, in the absence of a control of the two first solenoid valves, the first hydraulic spool valve will naturally be with the third active spool thereof, and the first hydraulic spool valve will then be closed. Similarly, in the absence of a control of the two second solenoid valves, the second hydraulic spool valve will naturally be with the third active spool thereof, and the second hydraulic spool valve will then be closed.

According to one possibility, a first double-acting balancing valve is disposed between the two first ways of the first hydraulic sub-circuit, downstream of the first hydraulic distributor, and a second double-acting balancing valve is disposed between the two second ways of the second hydraulic sub-circuit, downstream of the second hydraulic distributor.

These double-acting valves are positioned between the hydraulic distributors and the double-acting hydraulic cylinders, which allow increasing the robustness of the hydraulic control circuit facing external lateral forces which can cause a desynchronization of the axles.

In a first embodiment, the first wheels are pivotally mounted on the first axle via first right and left pivots, and a first steering mechanism mechanically connects the first right and left pivots for a common orientation of the first wheels, and the first actuator is coupled to one of the first right and left pivots, and the second wheels are pivotally mounted on the second axle via second right and left pivots, and a second steering mechanism mechanically connects the second right and left pivots for a common orientation of the second wheels, and the second actuator is coupled to the one of the second right and left pivots.

Thus, the steering of the wheels takes place by pivoting the wheels on the axles which themselves do not turn, according to a mounting called pivot axle mounting.

In a second embodiment, the first axle is pivotally mounted on the chassis by means of a first steering ring gear for a common orientation of the first wheels, and the first actuator is coupled to said first steering ring gear, and the second axle is pivotally mounted on the chassis by means of a second steering ring gear for a common orientation of the second wheels, and the second actuator is coupled to said second steering ring gear.

Thus, the steering of the wheels takes place by pivoting the axles, according to a mounting called rotating axle mounting.

According to one possibility, the control device is a wireless remote control.

According to one variant, the control device is a wired control.

According to another possibility, a wedging system is provided on the chassis to bear on ground and take off the first wheels and the second wheels from the ground.

Advantageously, the wedging system is a a hydraulic wedging system which is connected to the hydraulic power plant powering the hydraulic control circuit.

In this manner, the hydraulic control circuit takes advantage of a hydraulic power plant present to power the hydraulic wedging system, which is conventionally the case in a self-erecting crane. Thus, the addition of the function offered by the steering system requires a reduced number of elements, because the hydraulic power plant is already present.

The invention also relates to a self-erecting crane comprising a mast which is mounted on a rotating platform and supporting a boom, said self-erecting crane further comprising a trailer assembly according to the invention, said rotating platform being mounted on the chassis of said trailer assembly, such a self-erecting crane being configurable between a transport configuration in which the mast and the boom are folded back on themselves, and a working configuration in which the mast and the boom are unfolded.

PRESENTATION OF THE DRAWINGS

Other features and advantages of the present invention will appear on reading the detailed description below, of a non-limiting example of implementation, made with reference to the appended figures in which.

DETAILED DESCRIPTION

Figure 1:
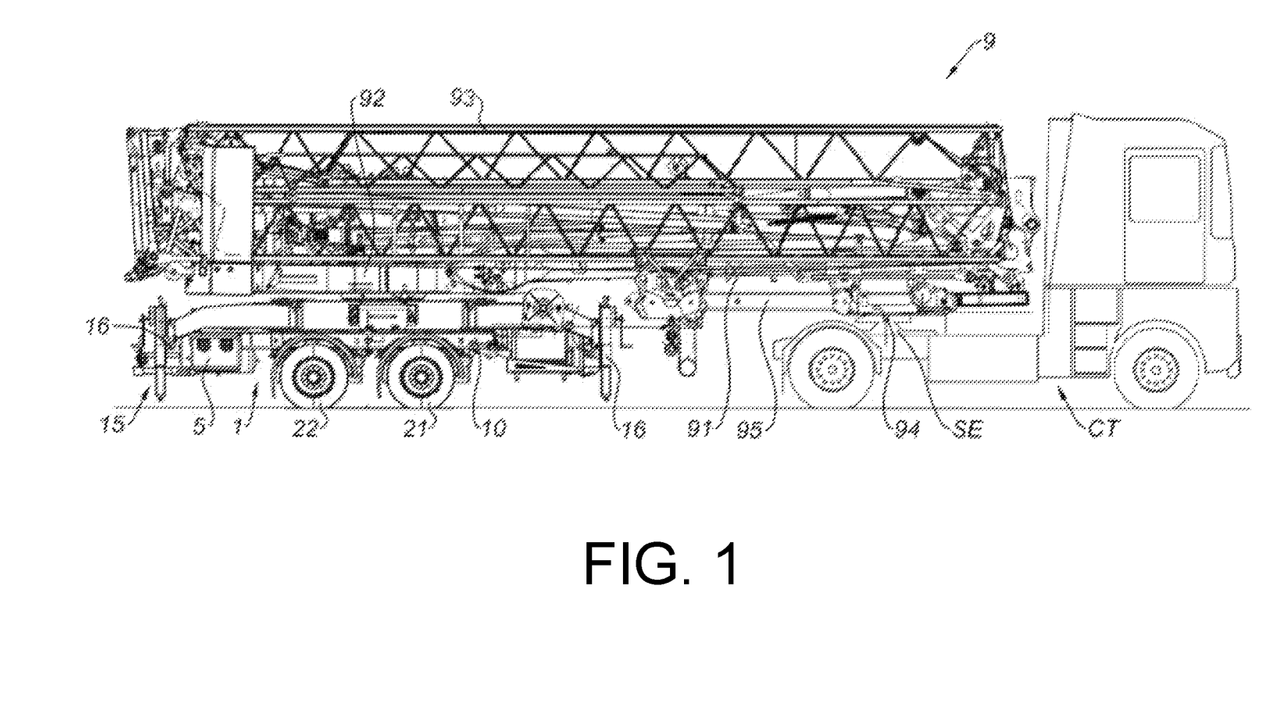
FIG. 1 is a schematic side view of a self-erecting crane equipped with a trailer assembly according to the invention, where the self-erecting crane is in the transport configuration.

The remainder of the description relates to a trailer assembly 1 according to an exemplary embodiment of the invention, provided for example to equip a self-erecting crane 9 shown in FIG. 1, it being reminded that such a trailer assembly 1 could be adapted for conveying other types of loads.

The self-erecting crane 9 comprises a mast 91 mounted on a rotating platform 92 and supporting a boom 93, where the self-erecting crane 9 is configurable between:
- a transport configuration, illustrated in FIG. 1, in which the mast 91 and the boom 93 are folded back on themselves; and
- a working configuration (not illustrated) in which the mast 91 and boom 93 are unfolded.

The self-erecting crane 9 thus comprises a folding/unfolding mechanism which acts on the mast 91 to fold and unfold the crane and thus make it pass from the working configuration to the transport configuration, and vice versa.

In order to be able to transport the self-erecting crane 9, in the transport configuration, the mast 91 supports a hitch element provided with a hitch shaft 94 suitable for being coupled to a fifth wheel SE provided on a rear platform of a tractor truck CT, as represented in FIG. 1. In this manner, the self-erecting crane 9 can be the subject of a transport on a fifth wheel.

It is moreover conceivable that the self-erecting crane 9 may, alternatively or optionally, comprise a towing drawbar 95 which is mounted on the mast 91; such a towing drawbar 95 has a hitch head 11 suitable for being coupled to a towing element of a tow truck (of the trailer type). In the version illustrated in FIG. 1, the towing drawbar 95 is stowable and can therefore be in a retracted position which is used during a transport on a fifth wheel or in the working configuration; and in a deployed position which is only used during a transport on a drawbar.

The rotating platform 92 is pivotally mounted along a vertical axis on the trailer assembly 1 which comprises a chassis 10 resting, via a suspension device, on a double-axle device comprising a first axle 11 supporting first wheels and a second axle 12 supporting second wheels 22.

The suspension device comprises for example a first suspension by leaf springs 110 supporting the first axle 11, and a second suspension by leaf springs 120 supporting the second axle 12.

Figure 3:
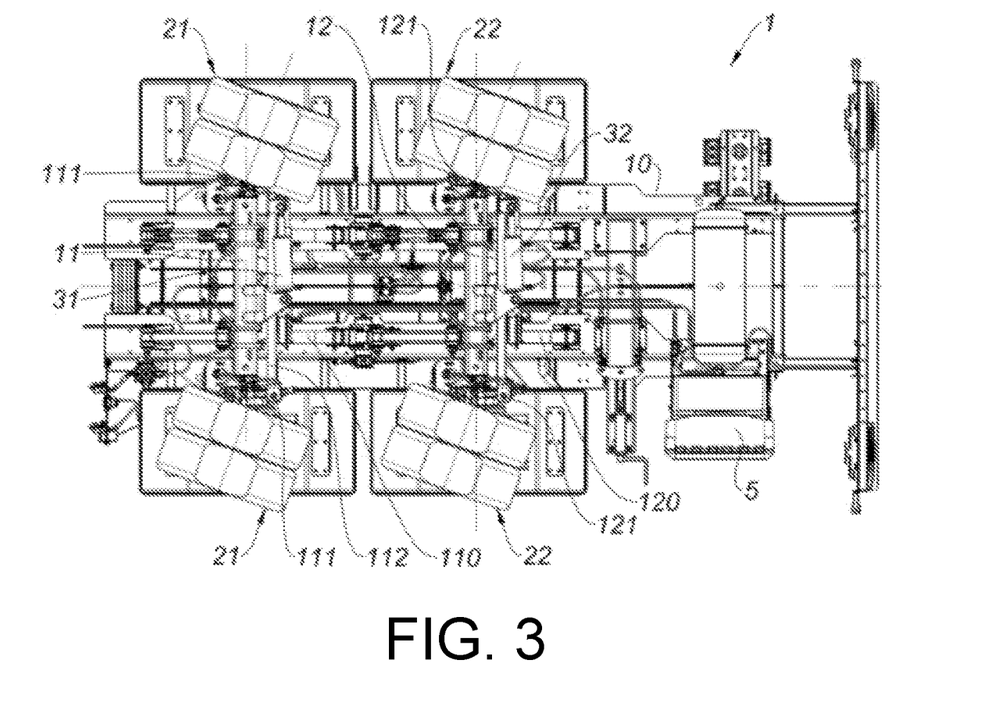
FIG. 3 is a schematic bottom view of the trailer assembly of FIG. 2.
Figure 4:
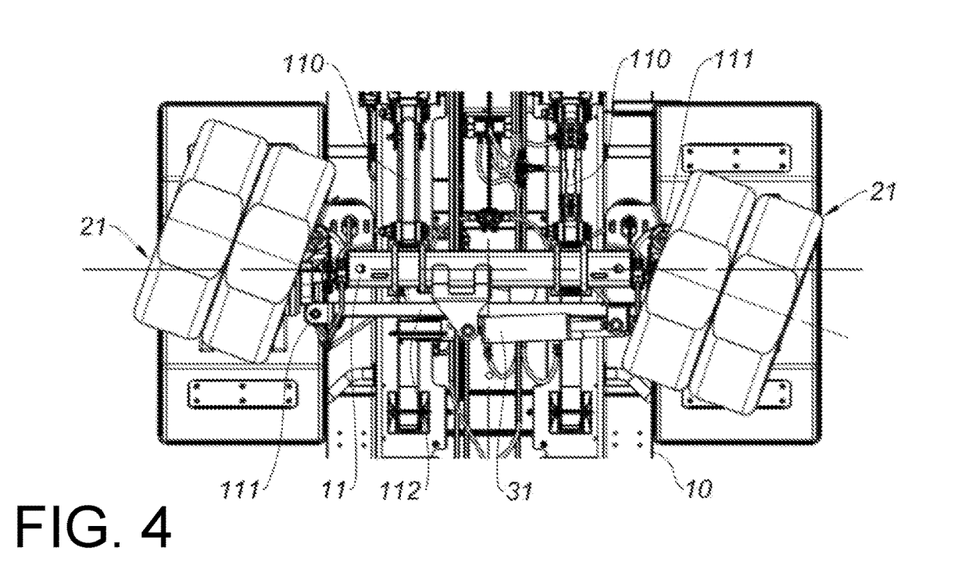
FIG. 4 is a schematic bottom view of one of the axles of the trailer assembly of FIG. 3.

In the embodiment illustrated in FIGS. 3 and 4, the first wheels 21 are pivotally mounted on the first axle 11 via first right and left pivots 111, and a first steering mechanism 112 (formed for example of a connecting rod) mechanically connects the first right and left pivots 111 for a common orientation of the first wheels 21.

Similarly, the second wheels 22 are pivotally mounted on the second axle 12 via second right and left pivots 121, and a second steering mechanism (formed for example of a connecting rod) mechanically connects the second right and left pivots 121 for a common orientation of the second wheels 22.

This trailer assembly 1 comprises a steering system to steer the first wheels 21 and the second wheels 22 during maneuvers below a low speed threshold, for example from 5 to 10 km/h, also called low speed maneuvers which are used to steer the trailer assembly 1, and therefore the self-erecting crane 9.

This steering system is a hydraulic steering system which comprises:
- a first actuator which is in the form of a first double-acting hydraulic cylinder 31 (hereinafter called first cylinder 31) coupled to the first wheels 21, and more specifically coupled to one of the first right and left pivots 111,
- a second actuator which is in the form of a second double-acting hydraulic cylinder 32 (hereinafter called second cylinder 32) coupled to the second wheels 22, and more specifically coupled to one of the second right and left pivots 121.

Thus, the first cylinder 31 allows steering (or rotating) the first wheels 21, while the second cylinder 32 allows steering (or rotating) the second wheels 22. The first wheels 21 and the second wheels 22 are not mechanically coupled or linked in rotation, such that the first cylinder 31 only rotates the first wheels 21, and not the second wheels 22, and the second cylinder 32 only rotates the second wheels 22, and not the first wheels 21.

Figure 5:
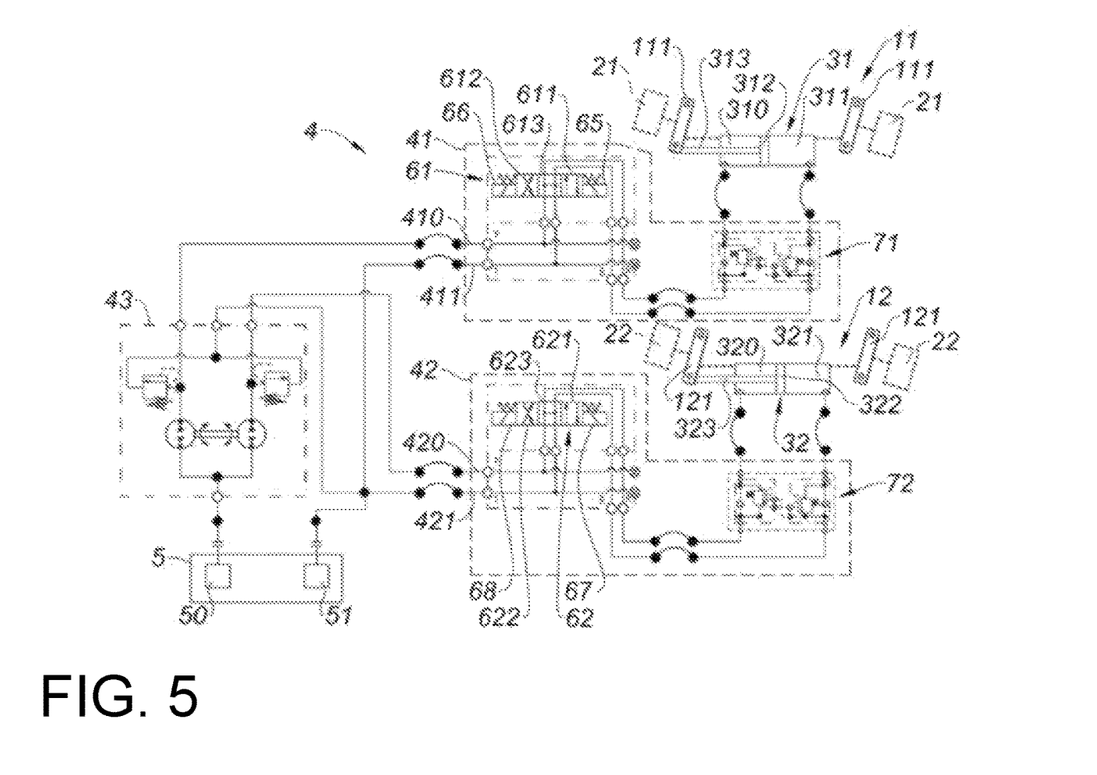
FIG. 5 is a schematic view of a hydraulic control circuit of a steering system adapted for the trailer assembly of FIG. 2.

With reference to FIG. 5, the hydraulic steering system further comprises a hydraulic control circuit 4 connected to the first cylinder 31 and to the second cylinder 32, and powered by a hydraulic power plant 5. This hydraulic control circuit 4 comprises:
- a first hydraulic sub-circuit 41 connecting the first cylinder 31 to the hydraulic power plant 5; and
- a second hydraulic sub-circuit 42 connecting the second cylinder 32 to the hydraulic power plant 5.

The first hydraulic sub-circuit 41 and the second hydraulic sub-circuit 42 are thus in parallel and are both powered by the hydraulic power plant 5. A flow divider 43 is disposed between the hydraulic power plant 5 and the first hydraulic sub-circuit 41 and the second hydraulic sub-circuit 42, to distribute the hydraulic pressure equally between the first hydraulic sub-circuit 41 and the second hydraulic sub-circuit 42.

Figure 2:
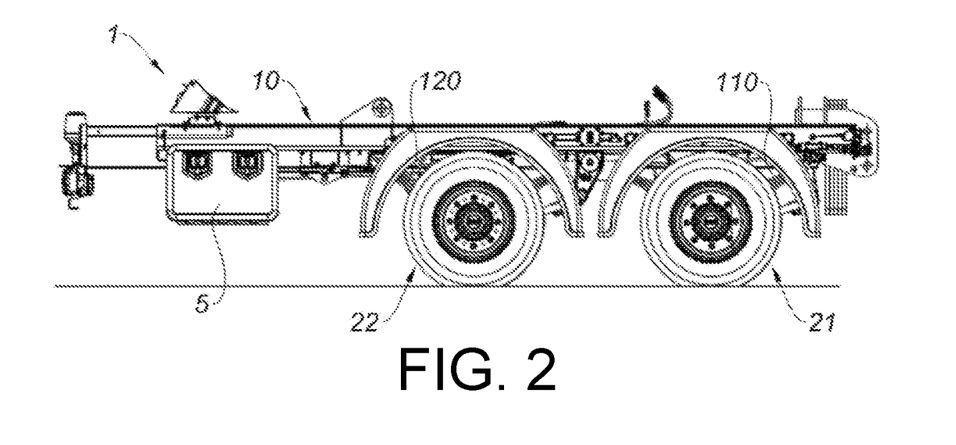
FIG. 2 is a schematic side view of the crane trailer assembly of FIG. 1.

This hydraulic power plant 5 can be carried by the chassis 10, as shown in FIGS. 1 and 2. It is moreover advantageous that this hydraulic power plant 5 is shared with another hydraulic system used in the trailer assembly 1, and for example in the self-erecting crane 9. For example, such a trailer assembly 1 may comprise a hydraulic wedging system 15 is provided on the chassis 10 to bear on ground and take off the wheels in the working configuration. Such a hydraulic wedging system 15 comprises several hydraulic cylinders 16 connected to the hydraulic power plant 5.

In a variant which is not illustrated, the first hydraulic sub-circuit 41 and the second hydraulic sub-circuit 42 are powered by two respective hydraulic power plants operating in parallel, with equivalent hydraulic pressures between the first hydraulic sub-circuit 41 and the second hydraulic sub-circuit 42.

The first hydraulic sub-circuit 41 and the second hydraulic sub-circuit 42 are identical, and the first cylinder 31 and the second cylinder 32 are also identical, such that the descriptions thereof will be made in common hereinafter.

The first hydraulic sub-circuit 41 (respectively the second hydraulic sub-circuit 42) comprises two first ways 410, 411 (respectively 420, 421), namely:
- a first supply way 410 (respectively 420) which provides the supply pressure and which is connected to a hydraulic pump 50 of the hydraulic power plant 5; and
- a first return way 411 (respectively 421) which allows the exhaust and which is connected to a reservoir 51 of the hydraulic power plant 5.

The first cylinder 31 (respectively the second cylinder 32) comprises a cylinder in which a piston 312 (respectively 322) slides, which is secured to a rod 313 (respectively 323) hinged on one of the first right and left pivots 111 (respectively one of the second right and left pivots 121). This cylinder has a compression chamber 310 (respectively 320) and an expansion chamber 311 (respectively 321) disposed on either side of the piston 312 (respectively 322).

Two actuations of the first cylinder 31 (respectively second cylinder 32) are therefore possible:
- a compression actuation, in which the compression chamber 310 (respectively 320) is in fluid connection with the first supply way 410 (respectively 420) and the expansion chamber 311 (respectively 321) is in fluid connection with the first return way 411 (respectively 421), thus providing a compression of the rod 313 (respectively 323) which is retracted, which corresponds to an actuation of the first cylinder 31 (respectively second cylinder 32) in a first direction, to steer the first wheels 21 (respectively second wheels 22) in a first direction;
- an expansion actuation, in which the expansion chamber 311 (respectively 321) is in fluid connection with the first supply path 410 (respectively 420) and the compression chamber 310 (respectively 320) is in fluid connection with the first return path 411 (respectively 421), thus providing a release of the rod 313 (respectively 323) which ds deployed, which corresponds to an actuation of the first cylinder 31 (respectively second cylinder 32) in a second direction opposite to the first direction, to steer the first wheels 21 (respectively second wheels 22) in a second direction, opposite to the first direction.

The flow divider 43 is positioned between the first supply path 410 and the second supply path 420 to distribute the hydraulic pressure from the hydraulic pump 50.

The hydraulic control circuit 4 comprises a control device which integrates:
- a first hydraulic spool valve 61 (hereinafter called first distributor 61) placed on the first hydraulic sub-circuit 41, upstream of the first cylinder 31, and more specifically; and
- a second hydraulic spool valve 62 (hereinafter called second distributor 62) placed on a second hydraulic sub-circuit 42, upstream of the second cylinder 32.

The first distributor 61 and the second distributor 62 are identical, such that their descriptions will be made in common hereinafter.

The first distributor 61 (respectively the second distributor 62) is a 4/3 type distributor, that is to say with four ways and three spools (or three positions), and in particular a closed center distributor. This first distributor 61 (respectively 62) comprises:
- a first open spool 611 (respectively 621) which puts in fluid connection the first supply way 410 (respectively second supply way 420) and the compression chamber 310 (respectively 320) of the first cylinder 31 (respectively second cylinder 32) and which puts in fluid connection the first return way 411 (respectively second return way 421) and the expansion chamber 311 (respectively 321) of the first cylinder 31 (respectively second cylinder 32), such that this first open spool 611 (respectively 621) is associated to an actuation of the first cylinder 31 (respectively second cylinder 32) in the first direction (actuation in compression);

a second open spool 612 (respectively 622) which puts in fluid connection the first supply way 410 (respectively second supply way 420) and the expansion chamber 311 (respectively 321) of the first cylinder 31 (respectively second cylinder 32) and which puts in fluid connection the first return way 411 (respectively second return way 421) and the compression chamber 310 (respectively 320) of the first cylinder 31 (respectively second cylinder 32), such that this second open spool 612 (respectively 622) is associated to an actuation of the first cylinder 31 (respectively second cylinder 32) in the second direction (actuation in expansion);

a third closed spool 613 (respectively 623), forming a central spool interposed between the first open spool 611 (respectively 621) and the second open spool 612 (respectively 622), and which closes the fluid connections between the first cylinder 31 (respectively second cylinder 32) and the two ways 410, 411 (respectively 420, 421), such that this closed third spool 613 (respectively 623) is associated to a non-actuation of the first cylinder 31 (respectively second cylinder 32).

The first distributor 61 (respectively the second distributor 62) is equipped with two first solenoid valves 65, 66 (respectively two second solenoid valves 67, 68) which control the selection between the first open spool 611 (respectively 621), the second open spool 612 (respectively 622) and the third closed spool 613 (respectively 623).

These two first solenoid valves 65, 66 (respectively two second solenoid valves 67, 68) are both equipped with a return system biasing towards a selection of the third closed spool 613 (respectively 623). In other words, the return systems (such as for example springs) on each side of the first distributor 61 (respectively second distributor 62) return the first distributor 61 (respectively second distributor 62) to the central (neutral) position when the first solenoid valves 65, 66 (respectively two second solenoid valves 67, 68) are not activated (or under voltage).

More accurately, the first solenoid valves 65, 66 (respectively second solenoid valves 67, 68) comprise a first right solenoid valve 65 (respectively a second right solenoid valve 67) and a first left solenoid valve 66 (respectively a second left solenoid valve 68), and:

an activation of the first right solenoid valve 65 (respectively second right solenoid valve 67) positions a selection of the first open spool 611 (respectively 621), and therefore drives an actuation of the first cylinder 31 (respectively second cylinder 32) in the first direction (actuation in compression);

an activation of the first left solenoid valve 66 (respectively second left solenoid valve 68) positions a selection of the second open spool 612 (respectively 622), and therefore drives an actuation of the first cylinder 31 (respectively second cylinder 32) in the second direction (actuation in expansion); and a non-activation of the two first solenoid valves 65, 66 (respectively second solenoid valves 67, 68) positions a selection of the third closed spool 613 (respectively 623), and therefore a non-actuation of the first cylinder 31 (respectively second cylinder 32).

Furthermore, a first double-acting balancing valve 71 is disposed between the two first ways 410, 411 of the first hydraulic sub-circuit 41, downstream of the first distributor, and a second double-acting balancing valve 72 is disposed between the two second ways 420, 421 of the second hydraulic sub-circuit, downstream of the second distributor 62.

Thus, the driving device is configurable in a low speed maneuvering mode in which at least one of the first cylinder 31 and the second cylinder 32 can be actuated to steer at least one of the first wheels 21 and of the second wheels 22.

More accurately, in this low speed maneuvering mode, the driving device is sub-configurable between:

a synchronized sub-mode «SSM» in which the first cylinder 31 and the second cylinder 32 can be actuated synchronously to steer the first wheels 21 and the second wheels 22, in a synchronized manner; and a desynchronized sub-mode «DSM» in which the first cylinder 31 and the second cylinder 32 can be actuated individually and independently to steer either the first wheels 21 alone or the second wheels 22 alone.

Figure 6:
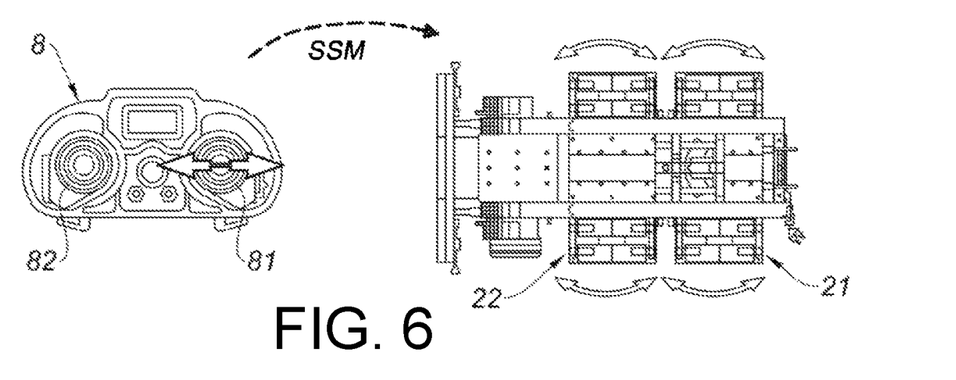
FIG. 6 is a schematic view of a control device during a driving in a synchronized sub-mode, with next to it the trailer assembly, from a top view.
Figure 7:
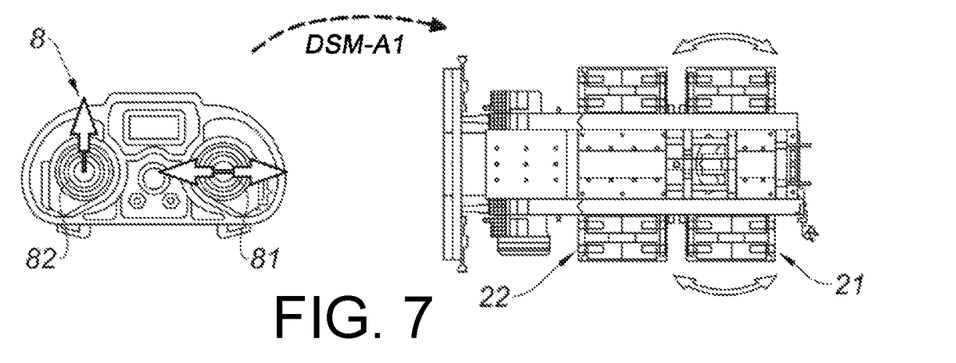
FIG. 7 is a schematic view of the control device of FIG. 6, during a driving in a desynchronized sub-mode with an actuation of the first actuator alone to steer only the first wheels, with next to it the trailer assembly, from a top view.
Figure 8:
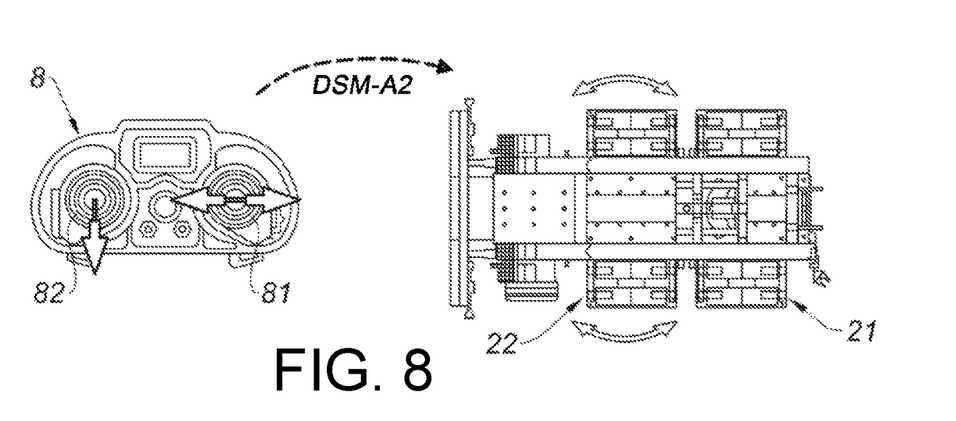
FIG. 8 is a schematic view of the control device of FIG. 6, during a driving in a desynchronized sub-mode with an actuation of the second actuator alone to steer only the second wheels, with next to it the trailer assembly, from a top view.

The trailer assembly 1 further comprising a control device 8, shown in FIGS. 6 to 8, which is connected to the driving device, and more specifically, connected to the four solenoid valves 65, 66, 67, 68 to:

select either the synchronized sub-mode «SSM» or the desynchronized sub-mode «DSM» when the driving device is in the low speed maneuvering mode; and select an actuation either of the first cylinder 31 or of the second cylinder 32 when the desynchronized sub-mode «DSM» is selected.

This control device 8 is for example a remote control, for a wireless and remote control. This control device 8 comprises for example two handles, a steering handle 81 and a selection handle 82.

The selection handle 82 is used to select the synchronized sub-mode «SSM», the desynchronized sub-mode «DSM» and to select the actuation of either the first cylinder 31 or the second cylinder 32 in the desynchronized sub-mode «DSM».

The selection handle 82 thus proposes three positions:

a neutral position associated to the synchronized sub-mode «SSM», which in FIG. 6 corresponds to a central position;

a position associated to the desynchronized sub-mode «DSM» and to the actuation «A1» of the first cylinder 31 alone (or sub-mode «DSM-A1», which in FIG. 7 corresponds to a high position; and a position associated to the desynchronized sub-mode «DSM» and to the actuation «A2» of the second cylinder 32 alone (or sub-mode «DSM-A2»), which in FIG. 8 corresponds to a low position.

This control device 8 is provided with a return means which biases a return of the selection handle 82 to the neutral position associated to the synchronized sub-mode «SSM». Also, in the absence of any action on the selection handle 82, it is the synchronized sub-mode «SSM» which is selected by default.

The steering handle 81 is used for its part to steer the wheels 21, 22 in the first direction (for example by pushing it to the right) or in the second direction (for example by pushing it to the left). This control device 8 is provided with return means which biases a return of the steering handle 81 into a neutral position associated to an alignment of the wheels 21, 22 in a straight position associated to a straight-line displacement.

With reference to FIG. 6, when the selection handle 82 is in the position associated to the synchronized sub-mode «SSM», the control device 8 synchronously activates:
- either the first right solenoid valve 65 and the second right solenoid valve 67 to drive a synchronized actuation of the first cylinder 31 and of the second cylinder 32 in the first direction, and therefore direct the first wheels 21 and the second wheels 22 in a synchronized manner in the first direction (if one acts on the direction handle 81 for a steering in the first direction);
- or the first left solenoid valve 66 and the second left solenoid valve 68 to drive a synchronized actuation of the first cylinder 31 and the second cylinder 32 in the second direction, and therefore steer the first wheels 21 and the second wheels 22 in a synchronized manner in the second direction (if one acts on the steering handle 81 for a steering in the second direction).

With reference to FIG. 7, when the selection lever 82 is in the position associated to the desynchronized sub-mode «DSM» and to the actuation «A1 of the first cylinder 31 alone (or «DSM-A1» sub-mode), the control device 8 activates:
- either only the first right solenoid valve 65 to drive an actuation of the first cylinder 31 alone in the first direction, and therefore steer the first wheels 21 alone in the first direction (if one acts on the steering handle 81 for a steering in the first direction), the second wheels 22 remaining in the straight position;
- or only the first left solenoid valve 66 to drive an actuation of the first cylinder 31 alone in the second direction, and therefore steer the first wheels 21 alone in the second direction (if one acts on the steering handle 81 for a steering in the second direction), the second wheels 22 remaining in the straight position.

With reference to FIG. 8, when the selection handle 82 is in the position associated to the desynchronized sub-mode «DSM» and with the actuation A2» of the second cylinder 32 alone (or sub-mode «DSM-A2»), the control device 8 activates:
- either only the second right solenoid valve 67 to drive an actuation of the second cylinder 32 alone in the first direction, and therefore steer the second wheels 22 alone in the first direction (if one acts on the steering handle 81 for a steering in the first direction), the first wheels 21 remaining in the straight position;
- or only the second left solenoid valve 68 to drive an actuation of the second cylinder 32 alone in the second direction, and therefore steer the second wheels 22 alone in the second direction (if one acts on the steering handle 81 for a steering in the second direction).

The driving device is also configurable in a transport mode in which the first cylinder 31 and the second cylinder 32 cannot be actuated to lock the wheels 21, 22 in the straight position associated to a straight-line displacement.

In this transport mode, the four solenoid valves 65, 66, 67, 68 are not activated, and thus the two cylinders 31, 32 are not actuated.

The control device 8 is connected to the driving device to select either the transport mode or the low speed maneuvering mode.

This transport mode corresponds to the neutral mode which associates the neutral position of the selection handle 82 and the neutral position of the steering handle 81. Thus, the neutral position of the selection handle 82 is associated to both the synchronized sub-mode «SSM» and the transport mode, it is only if one acts or not on the steering handle 81 that one passes from one to the other.

Figure 9:
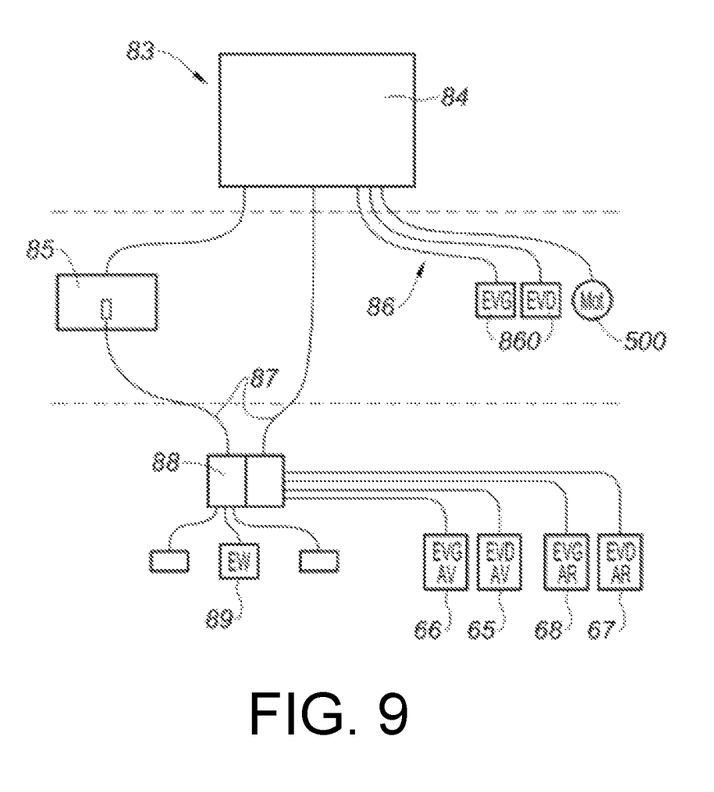
FIG. 9 is a schematic view of a power supply circuit adapted for the invention implemented in a self-erecting crane.

FIG. 9 illustrates a power supply circuit 83 adapted for a self-erecting crane. Indeed, conventionally, a self-erecting crane is equipped with an electrical cabinet 84 powered by an autonomous electrical source 85, for example disposed on the chassis 10, comprising one or several electric battery (batteries). Standard cabling 86 connect the electrical cabinet 84 to solenoid valves 17 driving the hydraulic cylinders 16 of the hydraulic wedging system 15, and to an electric motor 500 of the hydraulic pump 50 of the hydraulic power plant 5. These elements 84, 85, 86, 860, 500 are already present on the self-erecting crane.

For the power supply of the previously described hydraulic steering system, a secondary cabling 87 is provided to connect the electrical cabinet 84 and the autonomous electrical source 85 to a secondary electrical unit 88, itself connected to the four solenoid valves 65, 66, 67, 68. This secondary electrical unit 88 can also be connected to an additional solenoid valve 89 which is used to connect the hydraulic power plant 5 either to the hydraulic wedging system 15 (once the crane is stopped), or to the hydraulic steering system and to the hydraulic control circuit 4 thereof (during low speed maneuvers).

Thus, the power supply for the hydraulic steering system is integrated into the crane, and is therefore cost effective because it does not require a dedicated power plant or a dedicated source. Similarly, the control device 8 is preferably that already used to control the crane in its various functions (folding/unfolding, lifting and distribution, wedging, . . . ).

The invention claimed is:

1. A trailer assembly, comprising a chassis, a suspension device, a double-axle device, first wheels and second wheels, where said chassis rests, via said suspension device, on said double-axle device, wherein the double-axle device comprises a first axle supporting said first wheels and a second axle supporting said second wheels, and wherein the trailer assembly comprises a steering system to steer the first wheels and the second wheels during maneuvers below a low speed threshold, said steering system comprises a first actuator which is coupled to the first wheels, a second actuator which is coupled to the second wheels, and a control circuit connected to the first actuator and to the second actuator,
wherein said control circuit comprises a driving device configurable in a low speed maneuvering mode in which at least one of the first actuator and the second actuator can be actuated to steer at least one of the first wheels and the second wheels,
wherein, in the low speed maneuvering mode, the driving device is sub-configurable between:
a synchronized sub-mode in which the first actuator and the second actuator can be actuated in a synchronized manner to steer the first wheels and the second wheels in a synchronized manner; and
a desynchronized sub-mode in which the first actuator and the second actuator can be actuated individually and independently to steer either only the first wheels or only the second wheels;
said trailer assembly further comprising a control device which is connected to the driving device to:
select either the synchronized sub-mode or the desynchronized sub-mode when the driving device is in the low speed maneuvering mode; and
select an actuation either of the first actuator or of the second actuator in the desynchronized sub-mode;
and wherein the control device includes:

a selection member to select among the three sub-modes comprising the synchronized sub-mode, the desynchronized sub-mode with actuation of the first actuator alone, and the desynchronized sub-mode with actuation of the second actuator alone; and a steering member to steer the first wheels and the second wheels.

2. The trailer assembly according to claim 1, wherein the driving device is configurable between:

a transport mode in which the first actuator and the second actuator cannot be actuated to lock the first wheels and the second wheels in a straight position associated to a straight-line displacement; and the low speed maneuvering mode;

and the control device is connected to the driving device to select either the transport mode, or the low speed maneuvering mode.

3. The trailer assembly according to claim 1, wherein the selection member comprises return means which biases a return of the selection member into the neutral position associated to the synchronized sub-mode.

4. The trailer assembly according to claim 1, wherein the steering member comprises return means which biases a return of the steering member into a neutral position associated to an alignment of the first wheels and the second wheels in a straight position associated to a straight-line displacement.

5. The trailer assembly according to claim 1, wherein the first actuator is a first cylinder and the second actuator is a second cylinder.

6. The trailer assembly according to claim 5, wherein the first cylinder is a first electric cylinder, the second cylinder is a second electric cylinder, and the control circuit is an electric circuit.

7. The trailer assembly according to claim 5, wherein the first cylinder is a first hydraulic cylinder, the second cylinder is a second hydraulic cylinder, and the control circuit is a hydraulic control circuit hydraulically powered by at least one hydraulic power plant, and said hydraulic control circuit comprises a first hydraulic sub-circuit connected to the first hydraulic cylinder and a second hydraulic sub-circuit connected to the second hydraulic cylinder, the first hydraulic sub-circuit and the second hydraulic sub-circuit being in parallel.

8. The trailer assembly according to claim 7, wherein the first hydraulic sub-circuit and the second hydraulic sub-circuit are hydraulically powered by a common hydraulic power plant, and a flow divider is disposed between the common hydraulic power plant and the first hydraulic sub-circuit and the second hydraulic sub-circuit.

9. The trailer assembly according to claim 7, wherein the first hydraulic sub-circuit and the second hydraulic sub-circuit are hydraulically powered by two respective hydraulic power plants operating in parallel.

10. The trailer assembly according to claim 7, wherein the driving device comprises:

a first hydraulic distributor placed on the first hydraulic sub-circuit and equipped with at least one first solenoid valve to actuate the first hydraulic cylinder, said at least one first solenoid valve being in connection with the control device; and a second hydraulic distributor placed on the second hydraulic sub-circuit and equipped with at least one second solenoid valve to actuate the second hydraulic cylinder, said at least one second solenoid valve being in connection with the control device.

11. The trailer assembly according to claim 10, wherein the first hydraulic cylinder is a first double-acting hydraulic cylinder joined to two first ways of the first hydraulic sub-circuit, and the second hydraulic cylinder is a second double-acting hydraulic cylinder joined to two second ways of the second hydraulic sub-circuit.

12. The trailer assembly according to claim 11, wherein:

the first hydraulic distributor is a first hydraulic spool valve which comprises at least one first open spool associated to an actuation of the first double-acting hydraulic cylinder in a first direction, and one second open spool associated to an actuation of the first double-acting hydraulic cylinder in a second direction opposite to the first direction, and in which the at least one first solenoid valve controls the selection between the first open spool and the second open spool;

the second hydraulic distributor is a second hydraulic spool valve which comprises at least one first open spool associated to an actuation of the second double-acting hydraulic cylinder in a first direction, and one second open spool associated to an actuation of the second double-acting hydraulic cylinder in a second direction opposite to the first direction, and in which the at least one second solenoid valve controls the selection between the first open spool and the second open spool.

13. The trailer assembly according to claim 12, wherein:

the first hydraulic spool valve comprises a third closed spool associated to a non-actuation of the first double-acting hydraulic cylinder, and the at least one first solenoid valve comprises at least two first solenoid valves which control the selection between the first open spool, the second open spool and the third closed spool; and the second hydraulic spool valve comprises a third closed spool associated to a non-actuation of the second double-acting hydraulic cylinder, and the at least one second solenoid valve comprises at least two second solenoid valves which control the selection between the first open spool, the second open spool and the third closed spool.

14. The trailer assembly according to claim 13, wherein the two first solenoid valves are each equipped with a return system biasing towards a selection of the third closed spool of the first hydraulic spool valve, and the two second solenoid valves are each equipped with a return system biasing towards a selection of the third closed spool of the second hydraulic spool valve.

15. The trailer assembly according to claim 11, wherein a first double-acting balancing valve is disposed between the two first ways of the first hydraulic sub-circuit, downstream of the first hydraulic distributor, and a second double-acting balancing valve is disposed between the two second ways of the second hydraulic sub-circuit, downstream of the second hydraulic distributor.

16. The trailer assembly according to claim 7, wherein a wedging system is provided on the chassis to bear on ground and take off the first wheels and the second wheels from the ground, and wherein the wedging system is a hydraulic wedging system which is connected to the hydraulic power plant powering the hydraulic control circuit.

17. The trailer assembly according to claim 1, wherein the first wheels are pivotally mounted on the first axle via first right and left pivots, and a first steering mechanism mechanically connects the first right and left pivots for a common orientation of the first wheels, and the first actuator is coupled to one of the first right and left pivots, and the second wheels are pivotally mounted on the second axle via second right and left pivots, and a second steering mechanism mechanically connects the second right and left pivots for a common orientation of the second wheels, and the second actuator is coupled to the one of the second right and left pivots.

18. The trailer assembly according to claim 1, wherein the first axle is pivotally mounted on the chassis by means of a first steering ring gear for a common orientation of the first wheels, and the first actuator is coupled to said first steering ring gear, and the second axle is pivotally mounted on the chassis by means of a second steering ring gear for a common orientation of the second wheels, and the second actuator is coupled to said second steering ring gear.

19. The trailer assembly according to claim 1, wherein the control device is a wireless remote control.

20. The trailer assembly according to claim 1, wherein a wedging system is provided on the chassis to bear on ground and take off the first wheels and the second wheels from the ground.

21. A self-erecting crane comprising a mast which is mounted on a rotating platform and supporting a boom, said self-erecting crane further comprising a trailer assembly according to claim 1, said rotating platform being mounted on the chassis of said trailer assembly, said self-erecting crane being configurable between a transport configuration in which the mast and the boom are folded back on themselves, and a working configuration in which the mast and the boom are unfolded.

* * * * *